United States Patent [19]
Weber et al.

[11] Patent Number: 6,144,550
[45] Date of Patent: Nov. 7, 2000

[54] INFLATABLE AND COLLAPSIBLE SCREEN

[76] Inventors: Paul J. Weber; Marianne Weber; Christopher P. Weber, all of 1 Seneca Rd., Ft. Lauderdale, Fla. 33308; Michael Weber, 13906 Tern La., Clearwater, Fla. 33762

[21] Appl. No.: 09/166,502

[22] Filed: Oct. 5, 1998

[51] Int. Cl.[7] ................................................. H05K 5/00
[52] U.S. Cl. ..................... 361/681; 361/682; 345/905; 345/903
[58] Field of Search ............................. 361/681, 682; 345/905, 903

Primary Examiner—Leo P. Picard
Assistant Examiner—Tung Minh Bui

[57] ABSTRACT

An inflatable and collapsible display screen for electronic devices such as portable computers, TV screens, LCD and the like, which provides a screen area of approximately the size of conventional and comparable portable computer monitor screens, and the like. Upon deflation, the display screen may be folded into a small package for storage and/or transport.

21 Claims, 4 Drawing Sheets

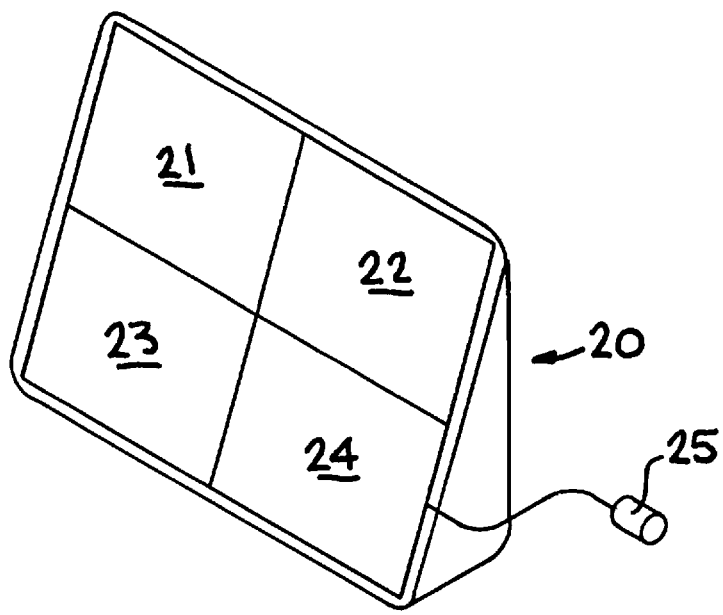
FIG. 3
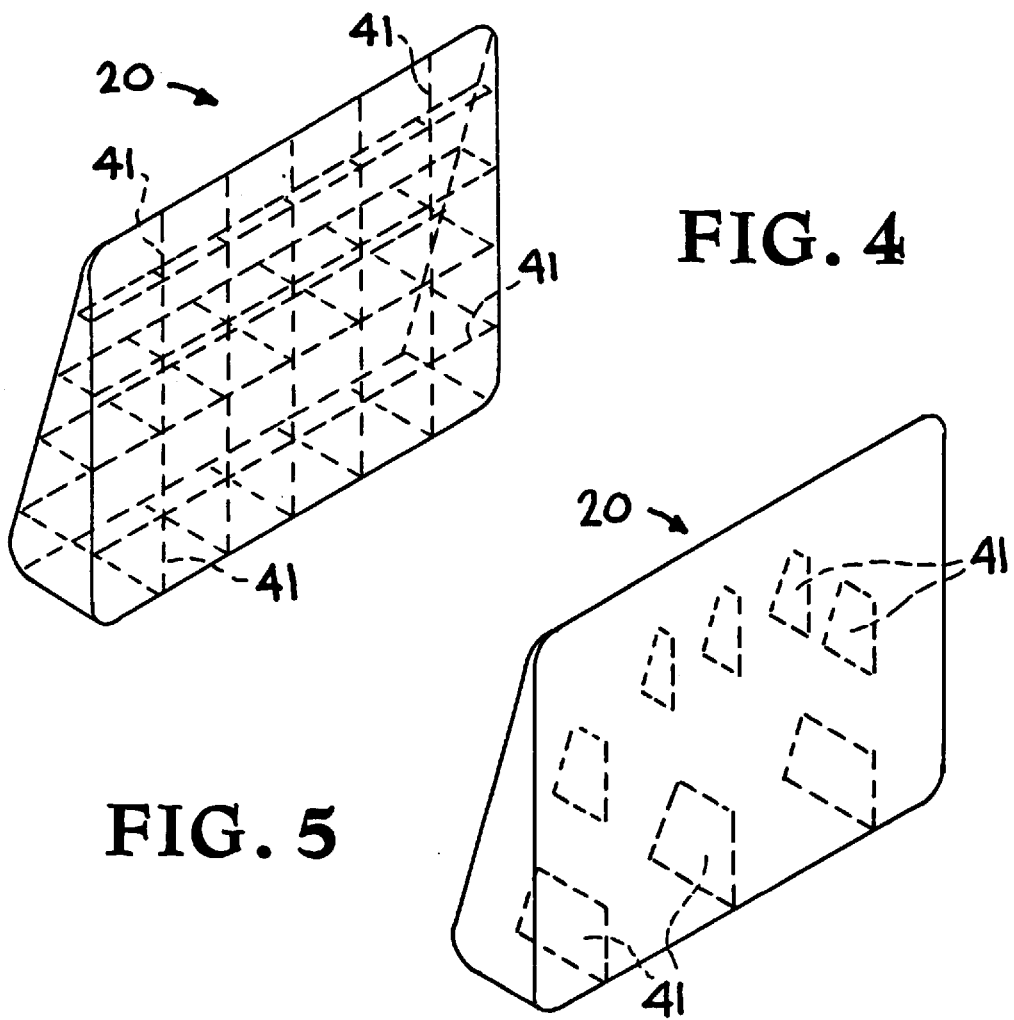
FIG. 4
FIG. 5

INFLATABLE AND COLLAPSIBLE SCREEN

FIELD OF THE INVENTION

This invention relates to an inflatable display screen easily collapsible for storage and/or transport and used in conjunction with electronic processing devices and more particularly to thin film transistors, portable computers, portable industrial controllers, LCD, TV screens, plasma displays, or the like.

DESCRIPTION OF THE PRIOR ART

The range of portable electronic information processing devices of most interest herein encompasses those broad families of computers, calculators, and data processor-based controllers which are readily transportable by individuals and usable on location. Such devices are usually self contained, and are commonly and descriptively known by numerous names, for example, notebook computers, lap-top computers, hand-held computers, pocket computers, portable microcomputers, portable industrial controllers, pocket calculators. These devices are sometimes collectively referred to herein merely as "portable computers". However, when the term "portable computer" is used, the entire range of portable electronic information processing devices is intended.

The problem particularly addressed herein arises from the small size of these portable computers or the like, which necessarily must be such that an individual may both comfortably transport the computer and comfortably operate the computer in temporary or remote locations, including on his or her lap or in his or her hand while, for example, traveling in an airplane or in a car. By the same token, since they are handily transportable, such portable computers ordinarily when not in use are either disposed for protection within a carrying case, or folded down upon themselves to form a protective carrying case. Thus, because of the requirements of portability, the display screens utilized in conjunction with such portable computers or the like are dimensionally quite small, which size constitutes a substantial limitation and is in multiple respects disadvantageous.

One such disadvantage is, of course, one of visibility itself, for below a certain character size, the individual using the computer must strain to see the information displayed on the screen. Concomitantly, the amount of such information displayed at any one time must necessarily be limited, and is frequently less than that available on the cathode ray tube (CRT) display of a desktop computer, for example. Yet another related disadvantage of present portable computers is that many software programs designed to run on personal, desktop, or home computers often cannot function on portable computers because their menus and screen displays are not compatible with the smaller capacity portable computer displays.

This set of difficulties will likely become more severe in the future, when it will probably be deemed desirable to further reduce the traveling size of display screens in general, and more particularly of portable computers. However, the size of the display screen cannot practically become smaller. Therefore, screen size is destined to become a primary factor in limiting appreciable further reduction in the size of portable computers. In contrast, portable computers having large display screens using large, easily readable characters would be significantly advantageous for many uses, including word processing, spread sheet operations, graphics operations and program writing. That is, while the computer shrinks, a way must be found to at least keep the display screen the same, previous size, or preferably, increase its usable information display area.

U.S. Pat. No. 5,220,521 to Kikinis, which is herein incorporated by reference, discloses a flexible keyboard for computers which can be used in combination with the screens of the present invention.

U.S. Pat. No. 5,105,186 to May et al, which is herein incorporated by reference, discloses an LCD touch screen having a viewing surface through which light passes into and out of the display and a back surface comprising a transflector such as a transflective film. Keys are displayed on the viewing surface opposite light dependent resistors in the array to indicate the viewing surface must be touched to actuate a key.

U.S. Pat. Nos. 5,804,773; 5,717,433; 5,708,160 and 5,105,186, all of which are incorporated herein by reference disclose touch screens and circuitry which can be used in the preparation of inflatable and collapsible screens of the invention.

It is to be understood that the term "active matrix" as used herein relates to a display bearing or exhibiting means such as a liquid crystal display, plasma display, field emission display and the like.

SUMMARY OF THE INVENTION

Generally, the invention provides an inflatable and collapsible display screen whereby the screen forms the active matrix or that an active matrix is used in combination with the inflatable and collapsible screen.

The display screen is for use with electronic devices either as a display such as for a computer, or as a control, such as in the form of a touch screen.

In accordance with one embodiment of the invention, there is provided a portable computer device comprising an inflatable and collapsible display screen mechanically and electrically connected to an electronic activation means capable of generating a controlled electronic signal to provide a display on the screen. Specifically, it relates to flexible inflatable display screens which are formed of one or more segments which may be so arranged to provide a substantial area for display and which may be deflated and collapsed in a compact mode for storage and travel. Thus, a display screen can provide a display area larger than the length and width of the portable device yet when deflated and collapsed can be stored for traveling within a space consistent with the dimension of such device. The screen itself can be the active matrix or an active matrix can be placed on the screen.

The electronic activation means is preferably selected from the group consisting of liquid crystal displays, active matrix displays, plasma displays and field emission displays.

In a preferred embodiment, such inflatable screens in combination with a flexible and inflatable roll-up electronic keyboard can provide when each is deflated and collapsed an even smaller device for storage and travel.

Preferably, segmented inflatable screens are bound to each other by silicone or other plastic tape and the display screens are provided with edge connectors terminating at each of the circuit patterns which are connected to a central processing unit containing microprocessors and/or other support circuitry having suitable connection to the portable computer device.

The screens can be self-standing or connected to an electronic device by means of fasteners.

It is, therefore, an object of the invention to provide an inflatable and collapsible display screen for use with electronic devices for efficient storage and/or transport.

It is another object of the invention to provide an inflatable and collapsible display screen for use with a portable computer which has the same display area while being readily collapsible into a smaller storage and transport mode.

It is a further object of this invention to provide an inflatable and collapsible display screen in combination with a flexible and inflatable keyboard which would yield an even smaller device for storage and/or transport.

It is yet another object of this invention to provide segmented display screens which show a unified image in all or some of the segmented display screens or provide separate distinct images in each of the said display screens.

A still further object of this invention is to provide a lightweight foldable display screen made of inexpensive and lightweight material which need only to be inflated to furnish a screen area of approximately the size of conventional and comparable screens.

Other objects and advantages of the invention will become more clearly understood from the drawings and the following detailed description of the preferred embodiments.

BRIEF DESCRIPTION OF THE DRAWINGS

FIG. 3 is a perspective view from the front of an inflatable and collapsible segmented display screen of this invention in a free standing embodiment.

FIG. 4 is a perspective view showing the back view of the display screen of FIG. 1 showing various configurations of internal baffles in phantom.

FIG. 5 is a perspective view of the inflatable segmented screen of FIG. 2 showing rearwardly articulating segments of two abuttably adjacent segments.

DETAILED DESCRIPTION OF THE PREFERRED EMBODIMENTS

Figure 1:
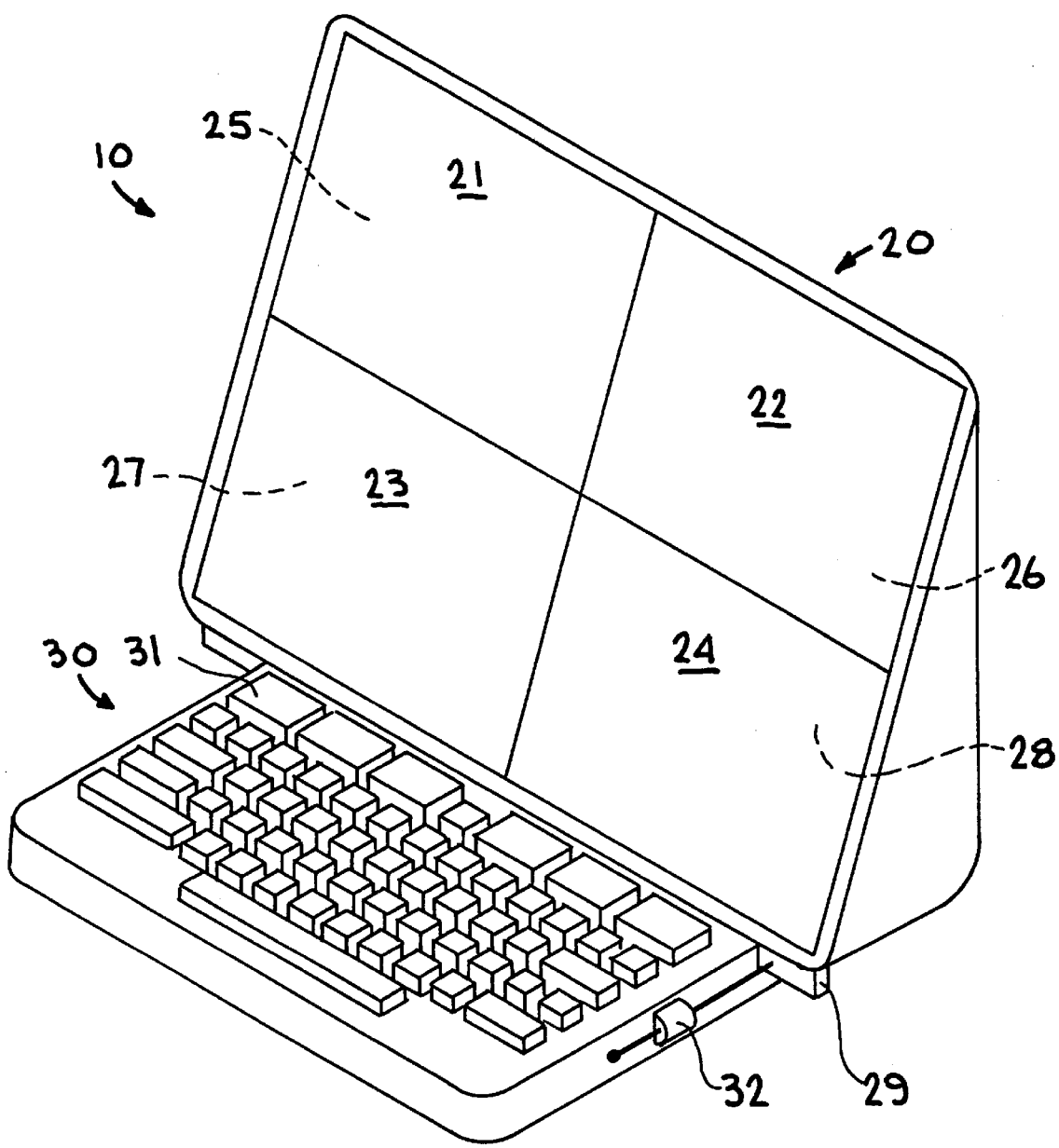
FIG. 1 is a perspective view from the front of a portable computer utilizing one embodiment of the inflatable and collapsible segmented display screen of the present invention, shown with a plurality of segments arranged in the predetermined array.

Reference is made to FIGS. 1 through 5 which depict various aspects of the same combination of a portable computer and the inflatable and collapsible display screen. Referring specifically to FIG. 1, the combination of a portable computer 10 comprising display screen 20 and central processing unit 30 utilizes one embodiment of the present invention. Segmented display screen 20 comprises a plurality of segments 21, 22, 23 and 24 abuttably disposed in a predetermined array for use, which screen is inflatable and collapsible and which segments are rearrangeable in compact relation for storage. Portable computer 10 typically may include a central processing unit 30 including a keyboard 31 or other manual input means, a data processing unit (not shown), memory means (not shown), a power source (also not shown) and screen adjusting means 32. Each display screen segment has disposed therein an electronically activated display means, such display means being shown as items 25, 26, 27 and 28.

Figure 2:
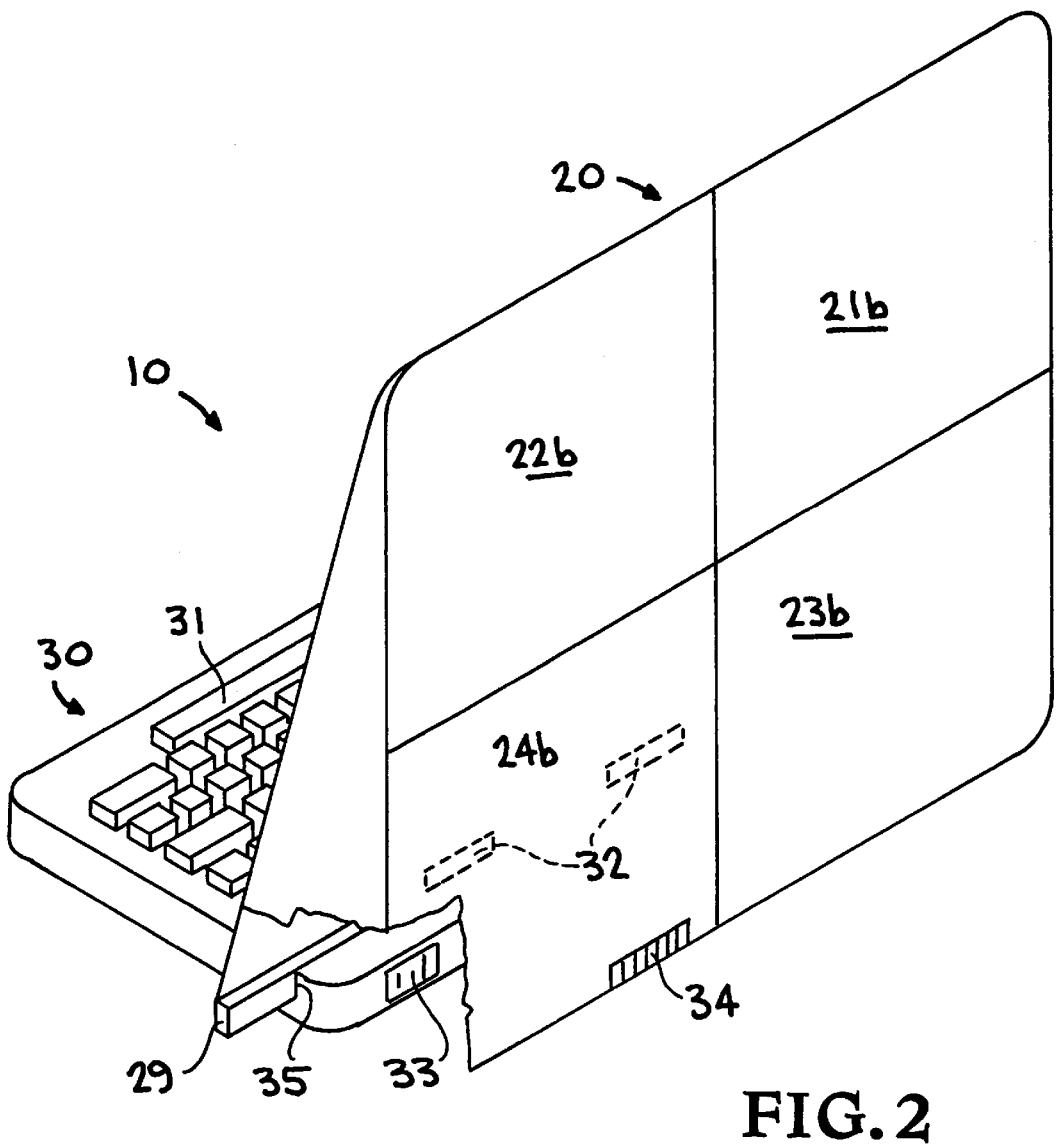
FIG. 2 is a perspective view from the front of the portable computer shown in FIG. 1 showing the mechanical and electrical connections between the segmented display screen and the central processing unit.

FIG. 2 is a rear view of FIG. 1 and shows the same combination of a portable computer 10, comprising an inflatable and collapsible segmented screen 20 as shown in FIG. 1 and also shows generally the means which provide the necessary mechanical and electrical connections which permit the display screen segments to be abuttably arranged in side-by-side relation in a predetermined array for use, while permitting the segments to be disarranged from the array and rearranged into compact relation for storage and/or transport. Additionally shown are means for providing mechanical and electrical connections between the display screen 20 and the electronic keyboard 31.

With reference to FIG. 2, these connections means will be described in detail. In one preferred embodiment, the display screen 20 of the present invention which includes appendage 29 which is designed to be inserted into slot 35. The display screen 10 may be inflated before or after insertion into slot 35. Such inflation may be performed either by a pressurized means or by lung power. The display screen 20 may include an inflatable hose (not shown). After insertion of the display screen 20 into slot 35 of the central processing unit 30, pivoting latch assemblies 33, which are contained within the housing of central processing unit 30, lock the display screen 20 into place. By means of extremely thin lead connections, the various segments of the display screen 20 are connected to the central processing unit 30. The lead connections are so thin that in practice they will not be seen and therefore will not interfere with the visual quality of the image in the display screen. In other respects, the wiring arrangement will be known to a person skilled in the art, so that a more detailed description is not necessary. The central processing unit 30 is energized by power inlet 33.

Both the electrical and mechanical connection means can be carried by either the back of a segment or by at least one side thereof. The mechanical connection means 32 can be either articularly constructed or be disengageable. Likewise, electrical connection means can be disengageable.

It is contemplated that in the most usual embodiment, the electrically activated display means carried by each segment will be planar in form and that when the plurality of segments is assembled in a desired array all the aforementioned means will lie in the same plane. However, it will be understood as being within the scope of this invention that some or all of the display means may be concave or convex. Even when the display means are each individually planar, it is within the scope of this invention that some of the display screen may be angularly extended toward the user.

An arrangement wherein the display device 20 shown in FIGS. 1 and 2 is connected to an electronic activation means by way of the programmable computer located within the central processing unit 30 using keyboard 31 for writing and entering of the desired text, and to a screen 20 for simultaneous display of the written text which is to be displayed by means of the device according to the invention. Alternatively, the signals may be generated remotely and fed through electrical conductor 34 from a distant source.

The inflatable and collapsible segmented display screen as illustrated in FIGS. 1 through 5 can be formed from at least two sheets of nonconductive, flexible, and resilient materials such as plastics. These segmented sections 21, 21b, 22, 22b, 23, 23b, 24 and 24b may be formed from sheets of thermoplastic or thermosetting nonconductive, flexible and resilient polymers, including polyesters, polyolefins such as polypropylene, polyethylene, polysilicones, polyvinyl chloride and polyurethanes. Preferably, the film sheets are joined by fusion bonding to form a hermetical seal. The hermetical seal also provides some structural rigidity to the display screen. However, other conventional bonding methods may be used such as adhesive bonding or ultrasonic sealing.

While FIGS. 1, 2, 3 and 4 essentially show triangular shapes for the display screen, it is within the scope of this invention to incorporate various shapes for this component. In fact, any geometrical configuration could be used in the design of the display screen.

Figure 8:
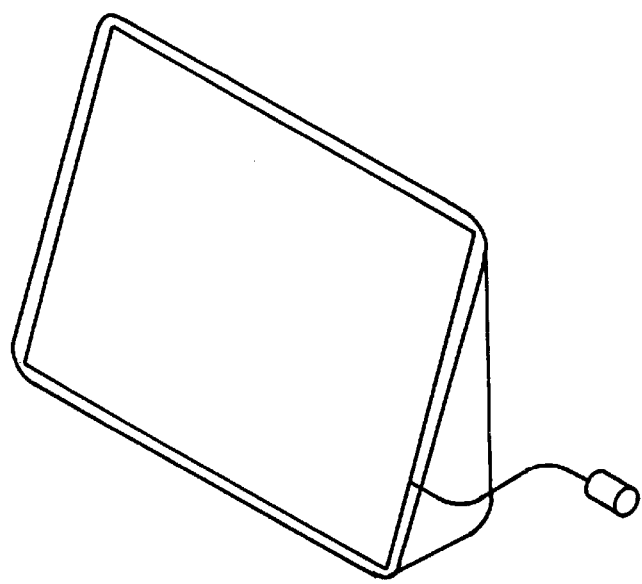
FIG. 8 shows a free-standing display screen embodiment.

Optionally, septae or baffles 41 which are two or three dimensional can be included within the gas compartment of the display screen as shown in FIG. 3. The baffles provide structural support to the fluid envelope but do not interfere with the movement of the fluid. The baffles also provide protection against overinflation and maintain proper size and shape. The baffles may be affixed to the inner portion of the sheet of the fluid envelope, e.g. by adhesives, melt welding or by ultrasonic methods. FIGS. 4 and 5 show a variety of orientation and shapes of the baffles 41 in the free-standing display screen embodiment of FIG. 3 and FIG. 8.

Referring to FIG. 3, when the screen 20 is deflated, segments 21, 22, 23 and 24 may be rearwardly articulated for storage or transport. For example, segments 22 and 24 may be folded over segments 21 and 23. The assembly may be folded in compact fashion for storage and/or transport.

Figure 6:
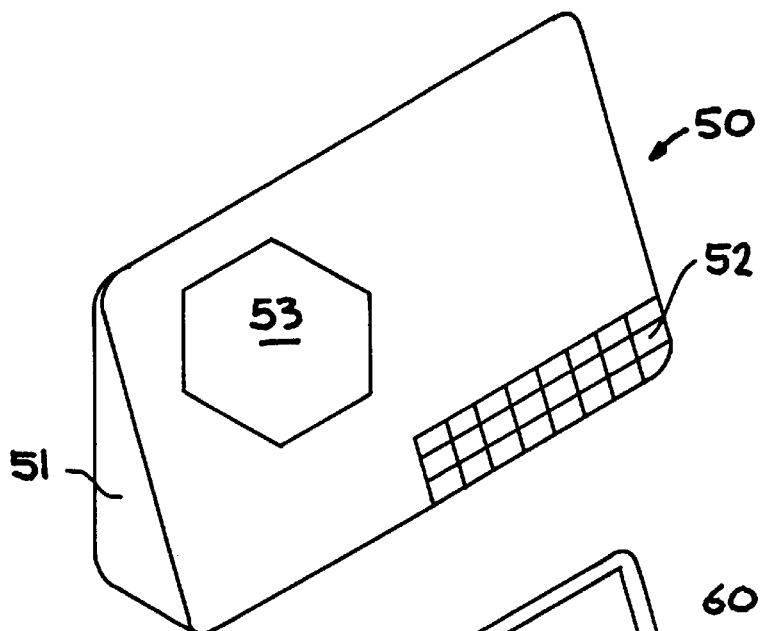
FIG. 6 is a perspective view of touch screen in accordance with the invention.

FIG. 6 illustrates a touch screen 50 comprising an inflatable support 51 having a liquid crystal display 53 through which light passes into and out of the display. The back surface of the display 53 comprises a transflector (not shown) for reflecting some of the light back through the display. A keyboard 52 is provided wherein a key is actuated by the viewing surface and limiting the light transmitted to light detecting means (not shown). The circuitry and keyboard interface is described in U.S. Pat. No. 5,105,186, which is herein incorporated by reference.

Figure 7:
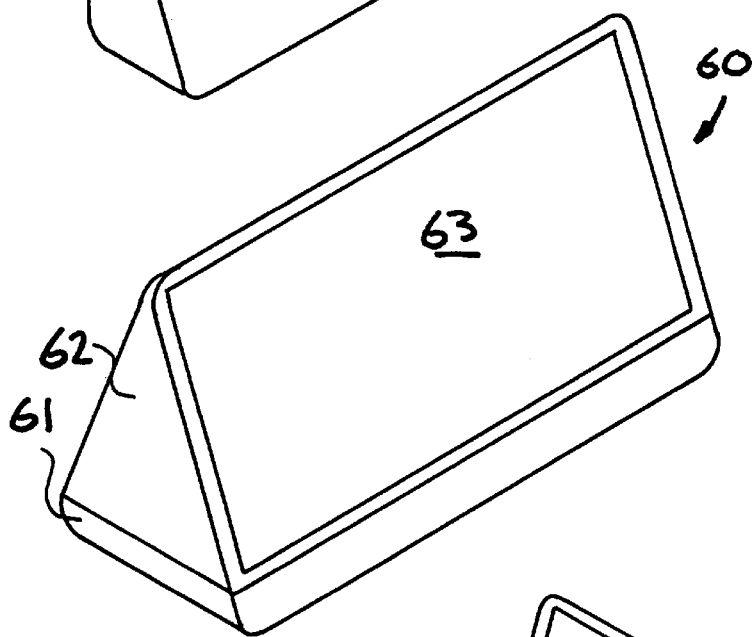
FIG. 7 is a perspective view of an inflatable screen with an active matrix.

FIG. 7 illustrates a free standing screen 60 of the invention which comprises an inflatable support and a bottom support 61 having baffles. The support 61 has a separate area for inflation preferably by use of a liquid so as to provide a firm stand. The screen 60 has an active display portion 63 which is not segmented. The interior of support and on the back of the display portion 63 are the electrical connectors. The screen 60 can be used in connection with a standard size keyboard.

While the drawings and specification have described the invention with reference to portable computers, it will be understood by those skilled in the art that the invention may have applications with stationary type computers as well.

In the drawings and specification there have been disclosed typical preferred embodiments of the invention and, although specific terms are employed, they are used in a generic and descriptive sense only and not for the purpose of limitation, the scope of the invention being set forth in the following claims.

What is claimed is:

1. An inflatable and collapsible display screen electrically connected to an electronic device containing electronic activation means capable of generating a controlled electronic signal to provide a display on said screen.

2. The device of claim 1 wherein said display screen is formed from a nonconductive, flexible and resilient polymer selected from polyvinyl chloride, polyolefin, polyester, polysilicone or polyurethane.

3. The device of claim 2 wherein said display screen comprises at least two film sheets having their edges sealed at their perimeter.

4. The device of claim 2 wherein said film sheets include a baffle means to provide support and to prevent overinflation.

5. The device of claim 4 wherein said baffle means include a plurality of baffles attached to the inner surface of at least one of said films.

6. The device of claim 1 including an activation means positioned within said display screen.

7. The device of claim 1 wherein said display screen comprises a plurality of segments each having a back, a front and at least three sides and each adapted to be abuttably disposed adjacent at least one other segment in side-to-side relation.

8. The device of claim 1 wherein said screen is connected to a portable computer.

9. The device of claim 8 wherein said computer has an inflatable keyboard.

10. The device of claim 8 wherein said activation means is disposed on the inner surfaces of the front screen.

11. The device of claim 8 wherein said portable computer includes a flexible and roll-up electronic keyboard assembly.

12. The device of claim 1 wherein said display screen is inflated with a fluid selected from air, an inert gas, a photointeractive gas, an inert liquid or mixtures thereof.

13. The device of claim 12 wherein the fluid is hermetically sealed within said display screen.

14. The device of claim 1 wherein said display screen is releasably attached to said central processing unit.

15. The device of claim 1 wherein said display screen is free standing and set apart but electrically connected to said central processing unit.

16. The device of claim 1 wherein said display screen is concave or convex.

17. The device of claim 1 wherein said screen comprises a collapsible and inflatable non-electrically conductive support having a rigid active display matrix.

18. The device of claim 1 wherein said screen is a touch screen.

19. The device of claim 18 wherein said touch screen comprises a liquid crystal display having a viewing surface through which light passes in and out of the display, a back surface having a transflector and a light detecting means for detecting a change in the light transmitted through the transflector caused by touching the viewing surface.

20. The device of claim 1 wherein said electronic activation means is selected from the group consisting of liquid crystal displays, active matrix displays, plasma displays, thin film transistors, and field emission displays.

21. A display screen comprising an inflatable and collapsible polymer having a surface upon which a projected image can be displayed.

* * * * *